June 16, 1964

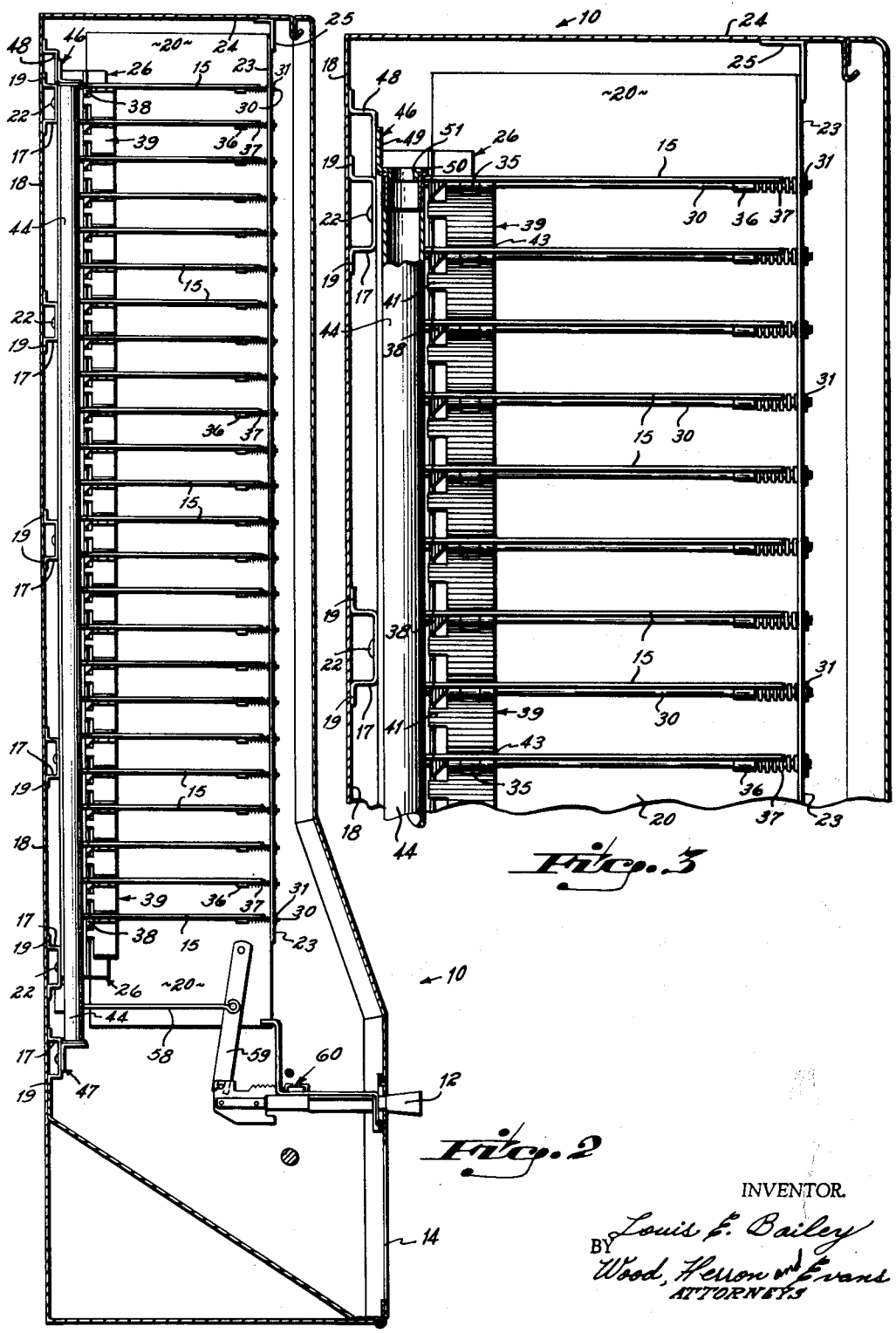

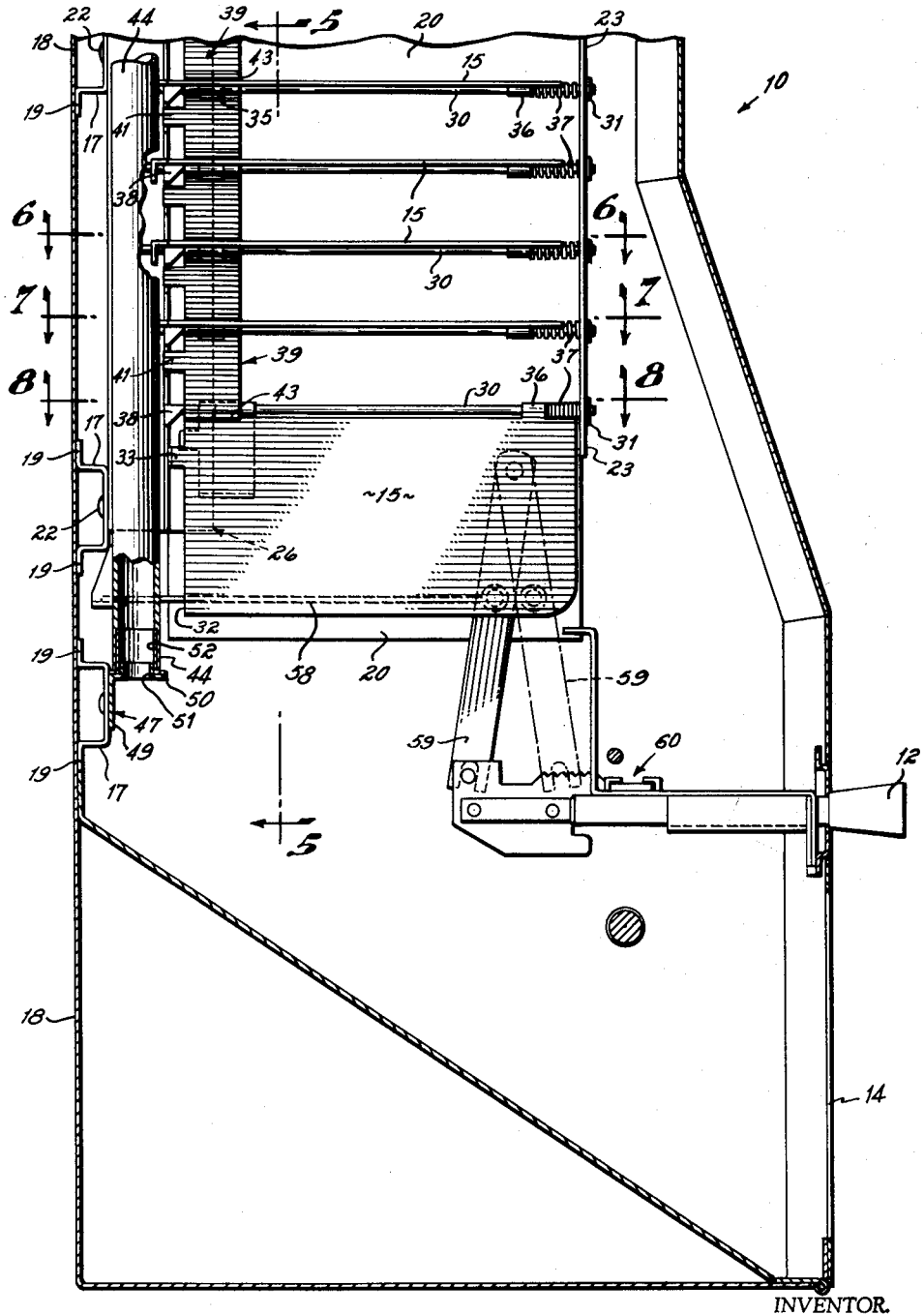

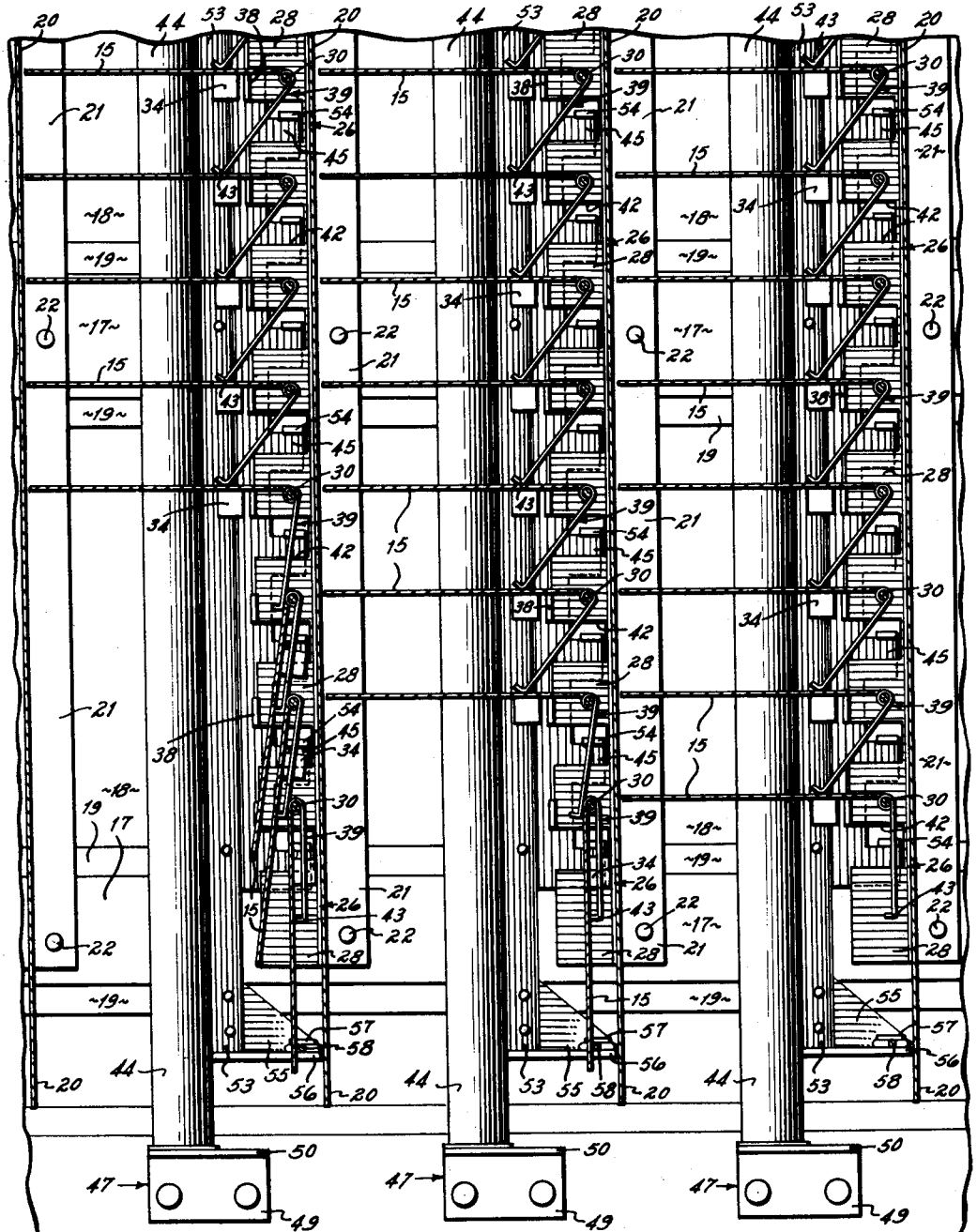

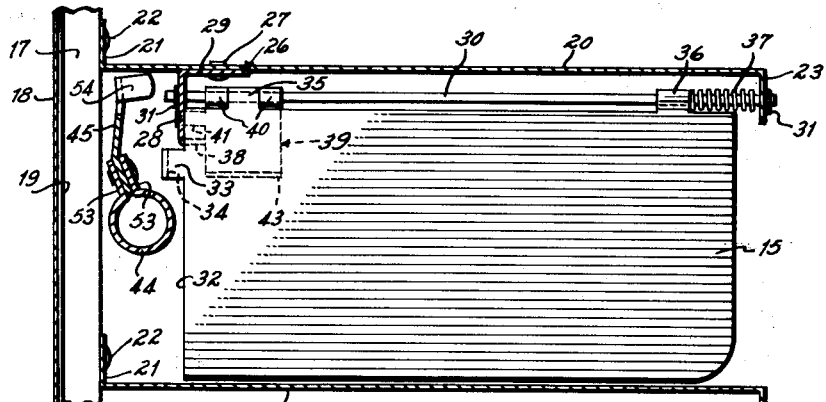
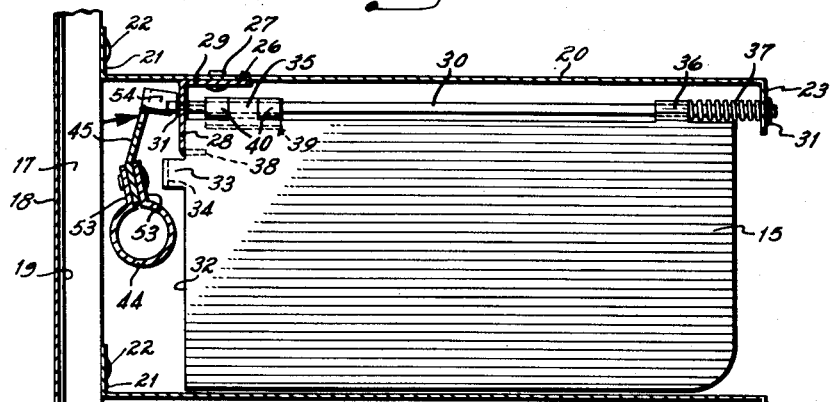
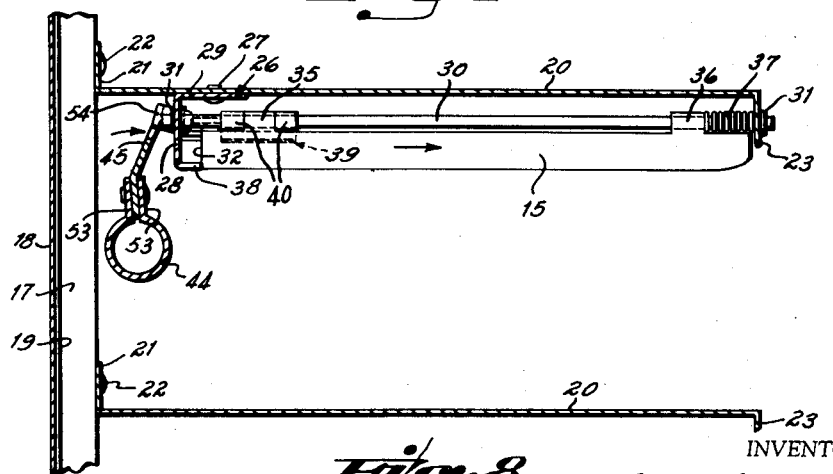

L. E. BAILEY 3,137,411

VENDING MACHINE WITH HINGEDLY AND LONGITUDINALLY MOUNTED SHELVES

Filed July 30, 1962

INVENTOR.

Louis E. Bailey

BY Wood, Herron and Evans

ATTORNEYS

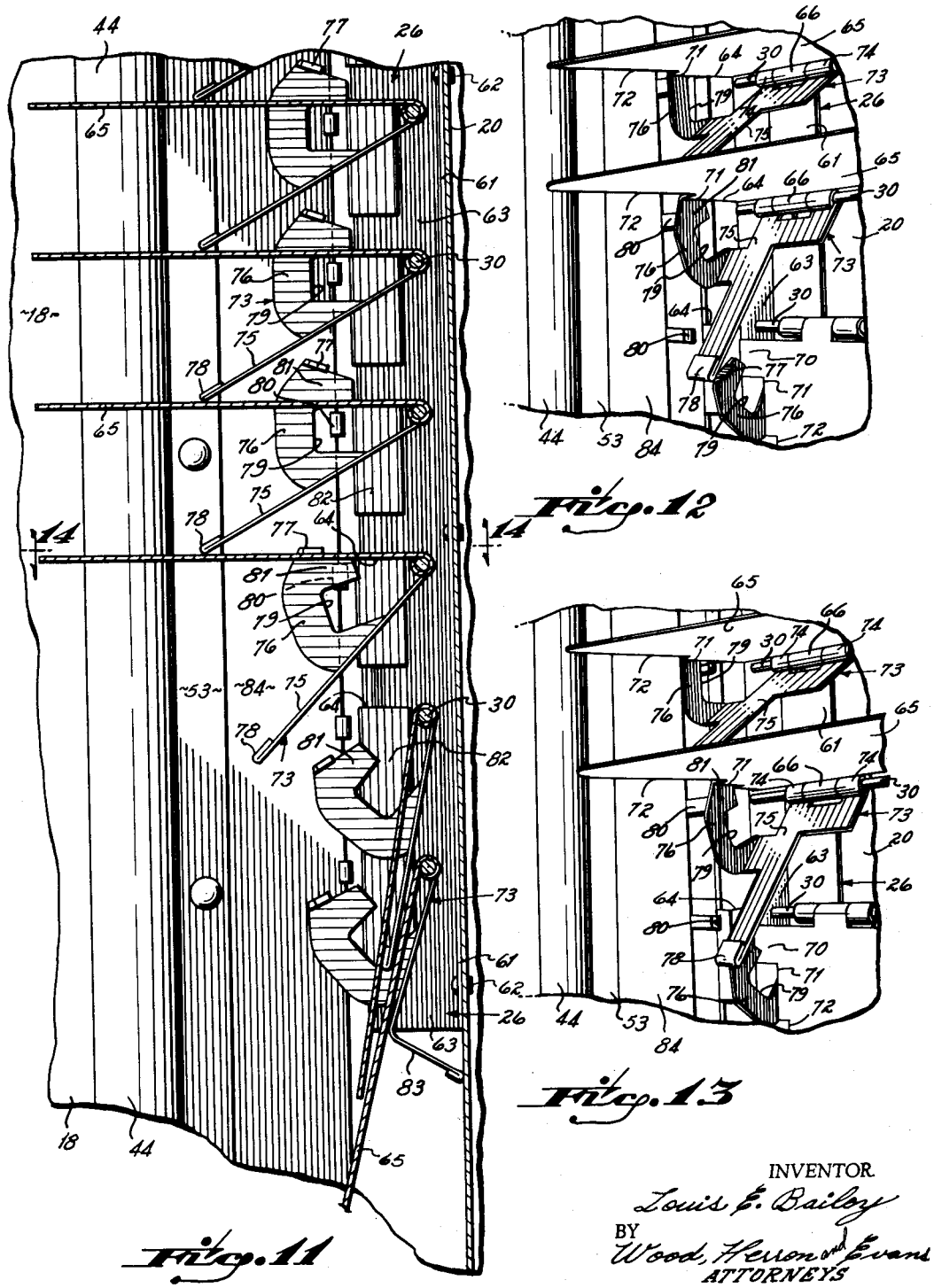

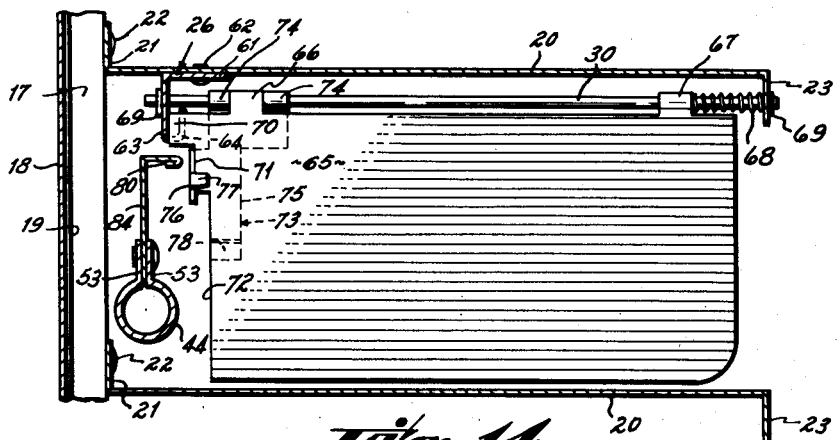
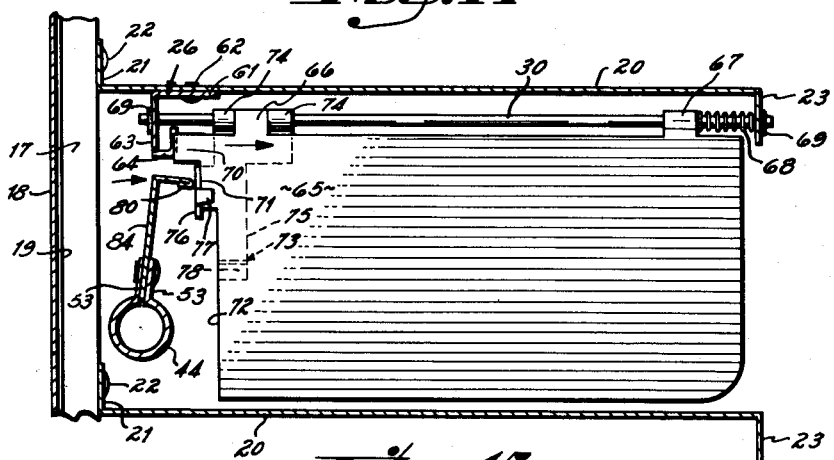
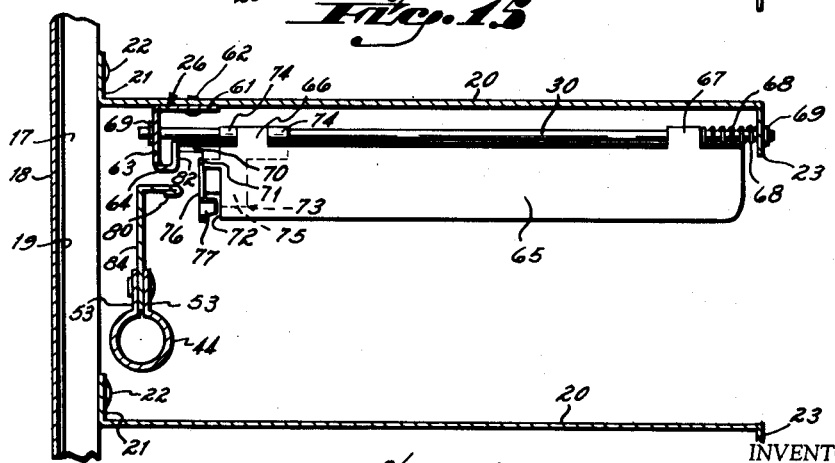

United States Patent Office 3,137,411
Patented June 16, 1964

3,137,411
VENDING MACHINE WITH HINGEDLY AND
LONGITUDINALLY MOUNTED SHELVES
Louis E. Bailey, Cincinnati, Ohio, assignor to William F.
Shepherd, Inc., Cincinnati, Ohio, a corporation of Ohio
Filed July 30, 1962, Ser. No. 213,366
11 Claims. (Cl. 221—90)

This invention relates to coin operated vending machines for dispensing articles of merchandise and it is disclosed in relation to a vending machine designed for use in automatic laundries to dispense small boxes of powdered soaps, detergents, bleaches, etc. A vending operation of this type requires a machine having a large capacity and one capable of handling a variety of different sizes of products, because a number of different brands of detergents, etc. must be available to meet customers' demands. However, a vending operation of this sort is a low profit-per-unit one, and one of the complaints of automatic laundry operators has been the high costs of vending machine of a size and capacity to satisfy their needs.

Thus, the primary objective of the invention has been to provide an inexpensive, compact vending machine to meet the demands and requirements of the automatic laundry trade. It will be apparent, however, that the machine of this invention is capable of dispensing any sort of a package of a size to fit the shelves and thus, it is not limited in utility to the automatic laundry trade.

The machine of this invention is that type in which the articles of merchandise to be dispensed rest upon drop leaf shelves which are arranged in a magazine one above the other, there being means provided to trip the shelves individually each time a coin is inserted in the machine, progressing upwardly from shelf to shelf starting with the lowermost one.

Generally, the prior art includes two systems of tripping the shelves in vending machines of this type. In one, the tripping device moves from shelf to shelf. Typically an endless chain, or the equivalent, carries the tripping device and the shelves are progressively tripped to drop the articles of merchandise by moving the chain to index the tripping device from shelf to shelf. This system has the disadvantage that it requires a considerable amount of space for the return run of the chain and a machine having a plurality of magazines as required in an automatic laundry becomes unduly large.

In the other system, the tripping device does not move from shelf to shelf. Instead, there is one tripping device common to all shelves in a magazine and this device operates each time a coin is inserted, but means are provided at each shelf so that the tripping device is effective to trip only the lowermost one of the shelves of those having merchandise upon them. The disadvantage of this system, as it exists in the prior art, is that it requires comparatively complex inter-linkages between shelves and the machines of the past, using this system, have been very expensive.

The vending machine of this invention employs the latter system of tripping. That is, the tripping of one shelf preconditions the one next above it to be tripped, and only that one, upon the next operation of the machine; and, in the fulfillment of the primary objective of this invention, this system of operation has been incorporated in a simple, inexpensive mechanism which requires little space.

Other objectives and advantages of the invention will be readily apparent to those skilled in the art from the following detailed description of the drawings in which:

FIGURE 2 is a cross sectional view taken on the line 2—2 of FIGURE 1.

FIGURE 3 is an enlarged fragmentary cross sectional view similar to FIGURE 2 but showing the upper part only of the machine.

FIGURE 4 is an enlarged cross sectional view showing the lower portion only of the machine.

FIGURE 5 is a fragmentary cross sectional view taken on the line 5—5 of FIGURE 4.

FIGURE 6 is an enlarged fragmentary cross sectional view taken on the line 6—6 in FIGURE 4.

FIGURE 7 is an enlarged fragmentary view taken on the line 7—7 in FIGURE 4.

FIGURE 8 is an enlarged fragmentary cross sectional view taken on the line 8—8 in FIGURE 4.

FIGURE 11 is an enlarged cross sectional view of a modification of the machine taken on the same cross sectional line as FIGURE 5.

FIGURE 12 is an enlarged, fragmentary, perspective view showing parts of two shelves with the lower one in condition to be tripped.

FIGURE 13 is a view similar to FIGURE 12 showing the lower shelf in the process of being tripped.

FIGURE 14 is a view similar to FIGURE 6 but showing the modified form of the invention.

FIGURE 15 is a view similar to FIGURE 7 but showing the modified form of the invention.

FIGURE 16 is a view similar to FIGURE 8 but showing the modified form of the invention.

Figure 1:
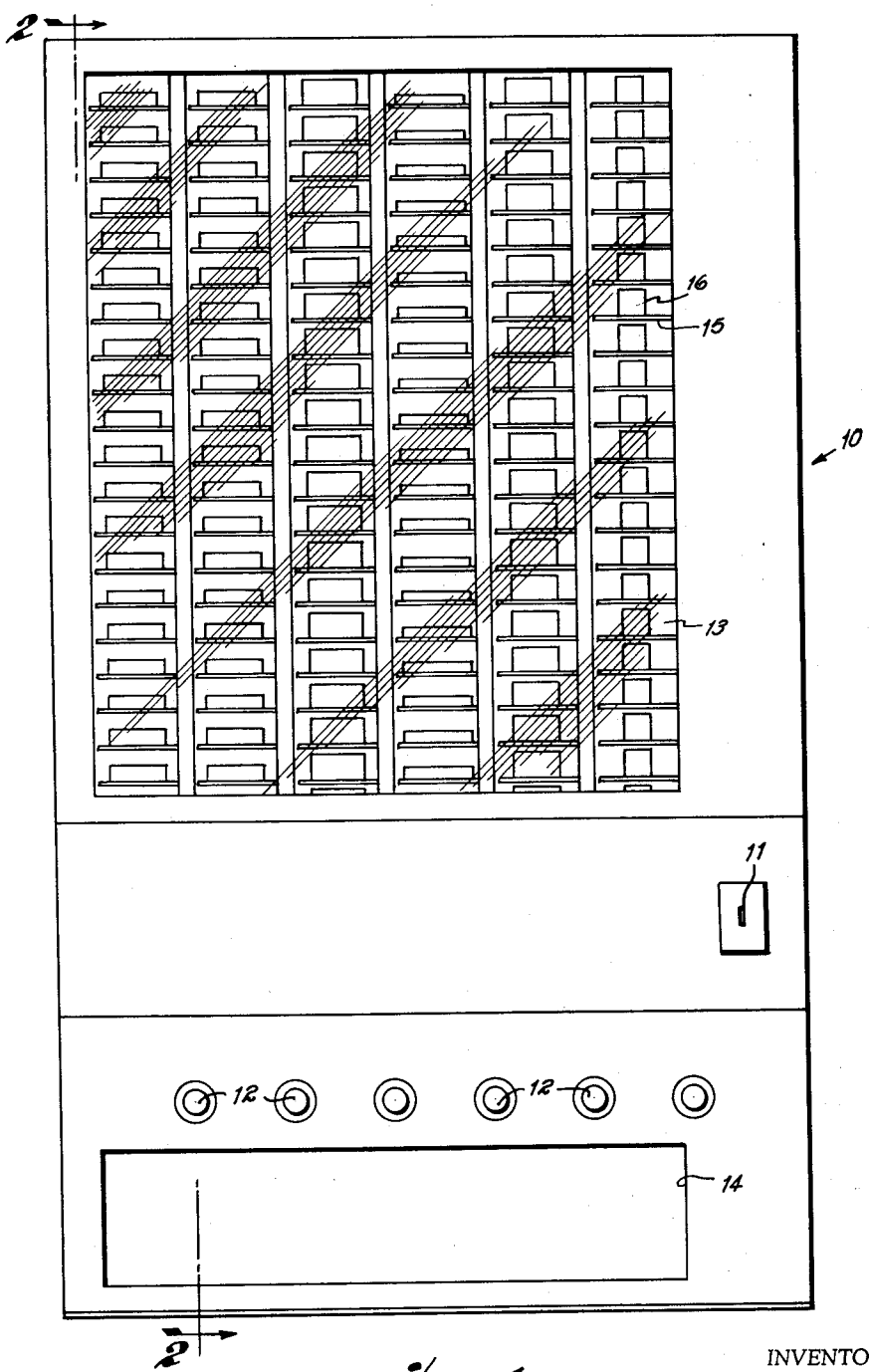
FIGURE 1 is a front elevational view of a vending machine incorporating the principles of this invention.

Referring now to FIGURE 1, a cabinet or housing for the machine is designated generally 10. A coin slot of conventional construction is identified at 11. The numeral 12 designates handles or knobs which are freed individually upon the insertion of a coin into the machine, the outward pulling motion of the handles resulting in the dispensing of the individual articles or mechandise which may be viewed through the glass front 13 of the machine. The articles, upon being dispensed are available for removal from the machine at the open front of a chute designated 14. The invention is concerned only with the construction of the magazines in which the articles to be dispensed are placed. The coin receiving mechanism may be of standard, known construction. The mechanism to insure that only one handle may be operated for each coin inserted into the machine may be of conventional construction and the cabinet construction may be conventional. Generally therefore, the invention is directed toward shelf tripping mechanism and as this term is used here it is intended to include the shelves themselves and the magazine in which a stack of these shelves resides. The shelves in the machine, only one of which is identified at 15 in FIGURE 1, are pivoted for swinging movement about axes which are horizontal and which extend from the back of the machine to the front of the machine. Tripping progresses upwardly from the bottom shelf toward the top shelf. Thus, the articles to be dispensed, only one of which is identified at 16 in FIGURE 1, rest upon the shelves and when the lowermost one of the shelves is tripped the merchandise is permitted to fall and in doing so it is directed to the open front of chute 14. The chute itself forms no part of this invention and it may be of known construction.

Six magazines are shown in FIGURE 1, with each magazine having twenty four shelves thereon. The number shown is by no means to be considered a limit of the capacity of an individual machine. More or less magazines may be utilized in a single machine depending upon the requirements of the installation. Additionally, more or less shelves may be utilized in a single magazine than those shown in FIGURE 1. Additionally, the shelves may vary in width and spacing from one magazine to another where required by the sizes and shapes of merchandise to be dispensed.

Inasmuch as all of the magazines in the machine illustrated in FIGURES 1–10 are substantially identical, like parts of different magazines are identified by the same numerals.

As may be best understood from FIGURE 2, the magazines in the cabinet are supported from six channel members, each one of which is designated 17, which extend horizontally across a back wall 18 of housing 10 in spaced parallel relationship. The side walls of each channel member have outwardly turned flanges 19—19 thereon and these flanges in each instance are spot welded to back wall 18. Each magazine includes a wall 20 which projects from the back of the machine toward the front of the machine. At the rear, the wall 20 has a right angular flange 21 thereon, which is turned toward the right as viewed from the front, and which is riveted as at 22 to each one of the channel members 17. Another flange 23 is turned over at a right angle, but in the opposite direction, at the forward edge of wall 20. The forward end of the wall 20 is supported from a top panel 24 of cabinet 10 by means of an L-shaped strap 25, one leg of which is spot welded to the underside of the top and the other leg of which is spot welded to the flange 23. (See FIGURE 3). A right angular strip 26 is riveted as shown at 27 to wall 20 adjacent to, but in spaced relationship to the channel members 17 such that one leg 28 of the right angular member is in spaced parallel relation to the flange 23 which is at the forward end of wall 20. The other leg 29 of the right angular member 26 receives the rivets 27. A plurality of hinge pins 30, there being 24 shown in FIGURE 2, are journalled between the flange 28 of angle member 26 and the flange 23 of wall 20. Flanges 23 and 28 have a plurality of holes through them for this purpose and the ends of the hinge pins simply project through these holes. The pins are prevented from sliding longitudinally by means of simple, sheet metal clips 31 which are engaged on the opposite ends thereof at the outer faces of flanges 23 and 28. These hinge pins pivotally journal the shelves 15.

As best viewed in FIGURES 6–8 each one of the shelves is made of sheet metal and is generally rectangular in outline. The rear edge of each shelf, which is designated 32 in these figures, is straight with the exception of an abutment 33 which extends rearwardly and which has the end thereof turned down as shown at 34. The function of this abutment will be explained at a later point. The side edge of each shelf adjacent to hinge pin 32 has two hinge barrels 35 adjacent to the rear and 36 adjacent to the forward end of the shelf, which are wrapped around the hinge pin. A coil spring 37 is interposed between the barrel 36 and the interface of flange 23, the coil spring being engaged around the hinge pin 30. It may be seen therefore, that each coil spring tends to slide the shelf toward the rear.

Figure 10:
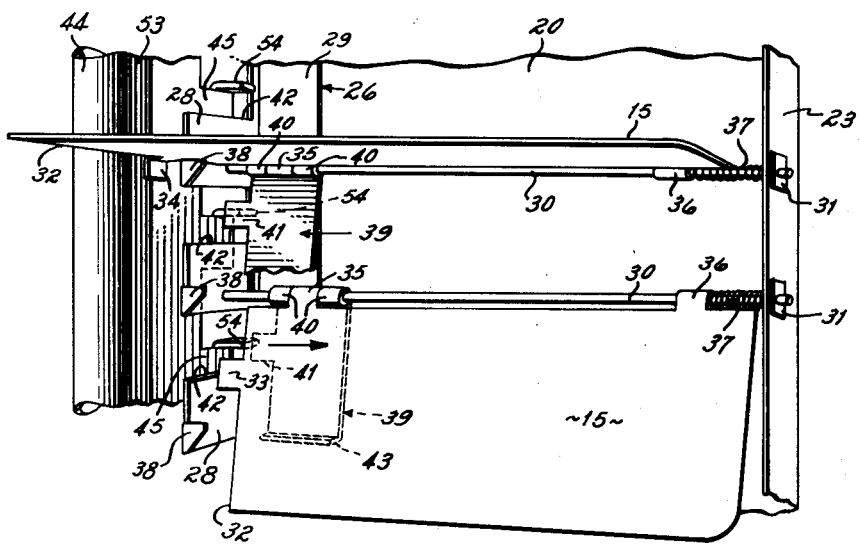
FIGURE 10 is a view similar to FIGURE 9 showing the lower shelf in the process of being tripped.

As may be best understood from FIGURES 2, 3, 4, and 6, the forward edge of flange 28 has a support in the form of a tab 38 turned over from its forward edge for each one of the shelves. When a shelf is toward the rear as illustrated in FIGURE 6, the shelf rests upon this support 38, and when the shelf is moved forwardly, as will be explained, against the pressure of the coil spring 37 the shelf is free of the support and may swing down to drop an article of merchandise from it. The dropping of the shelf causes the projecting abutment 33 to come into a position in which it abuts against the inner surface of the flange 28, and thus, the shelf is held in the forward position with the spring 37 being compressed. This position of the shelf is illustrated in FIGURES 8 and 10.

Figure 9:
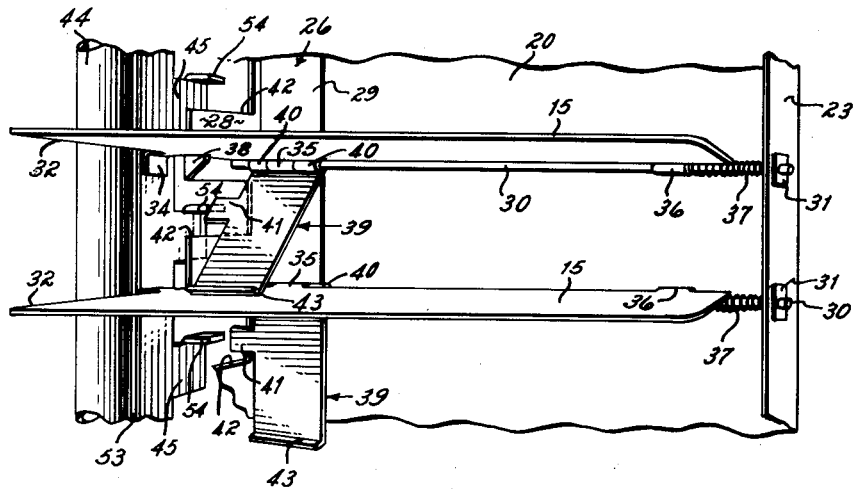
FIGURE 9 is a fragmentary perspective view showing two shelves with the lower one in condition to be tripped.

Each shelf has a hinged tab 39 associated with it. This hinged tab has two hinge barrels on it which are indicated at 40—40 and which barrels are engaged on the hinge pin at the opposite sides of the hinge barrel 35 which is adjacent to the rear edge of the shelf. The hinge barrels 40 thus straddle the barrel 35 on the shelf and any sliding movement of the hinged tab either toward the rear or toward the front is accompanied by a similar sliding movement of the shelf on the hinge pin 30. As best seen in FIGURES 9 and 10, each hinged tab 39 has a projection 41 on it which extends toward the rear of the magazine. In each instance, the flange 28 is cut out as at 42 in the areas thereof adjacent to the projections 41. (See FIGURE 9.) Also, as may best be seen from this figure, each hinged tab is longer than the vertical spacing between shelves so that when the shelves are in their horizontal positions, the respective hinged tabs rest upon the shelves such that they slant down and out away from the hinge pins and such that each hinged tab associated with a shelf has its lower edge 43 resting upon the shelf immediately below it. As shown, the lower edge 43 of each hinged tab is turned up to present a smooth surface to the shelf.

Each magazine has a tripping device associated with it which includes a vertical tube 44 having a plurality of pusher fingers 45 mounted on it. The tube is mounted at the back of a magazine for pivotal movement about a vertical axis between two brackets 46 and 47, the former being at the upper end of the tube and the latter being at the lower end of the tube. In each instance, the brackets are secured to the back wall 18 of the housing. At the lower end, the bracket 47 is secured to a channel member 17. This bracket is simply riveted to this channel member. At the upper end, the bracket 46 is fastened by means such as spot welding to a hanger 48 which is spot welded to the back wall 18 of the cabinet. Each bracket 46 and 47 is generally L-shaped having one leg 49 which is secured to the hanger 48, in the case of the upper one, or the channel 17 in the case of the lower one, plus a right angular leg 50 which is formed to provide a cylindrical bushing 51 which fits into the end of the tube 44. As shown, an antifriction sleeve bearing 52 may be interposed between the tube and the cylindrical bushing 51.

The tube 44 is of split construction and it has two radial flanges 53—53 at one side thereof between which the pusher fingers 45 are sandwiched and riveted in place. Each pusher finger comprises a strip of sheet metal having one end engaged between the flanges 53—53 and having the outer end thereof turned over as shown at 54 toward the front of the machine. All of the pusher fingers are aligned vertically with one another and as shown in FIGURES 6–8 the fingers are angulated slightly with respect to the flanges 53—53 so that they extend slightly toward the front of the machine with respect to the flanges 53—53. One pusher finger is provided for each shelf and in each instance, the outer end of the pusher finger is in alignment with one of the cut out areas 42 in flange 28.

As shown in FIGURE 5 the lower end of each tube 44 has a triangular shaped bracket 55 riveted to it between the flanges 53—53, the lower edge of the bracket being turned at a right angle toward the front of the machine to provide a ledge 56. The ledge carries a flat-headed rivet 57 which provides a journal for the rear end of a reach rod 58. The forward end of rod 58 is riveted to the side of a link 59 which, in turn, is pivotally attached to the lower end of the wall 20 for swinging movement in a vertical plane in which the lower end of the link 59 swings toward and from the back of the machine. The lower end of link 59 is attached to one of the operating handles 12 of the machine so that when the handle is pulled out the linkage provided causes the tube of the trigger mechanism to turn to swing the pusher fingers such that their outer ends move toward the front of the machine into and through the cut out areas 42 in flange 28. Conventional mechanism such as that indicated generally by the numeral 60 may be employed to insure that only one handle may be operated for each coin dropped into the machine.

In the following description of the operation of the embodiment of the machine shown in FIGURES 1 through 10, it is assumed that all shelves in a magazine are all in their horizontal positions initially. When one handle at the front of the machine associated with the magazine is pulled out, the tube 44 associated with this handle is caused to rotate which swings all of the pusher fingers through approximately 20° of movement, such that their outer ends move in paths which roughly parallel the axes of the hinge pins, the movement being toward the front of the machine. As shown in the magazine at the right side of FIGURE 5 all of the hinged tabs 39 except the lowermost one are resting upon shelves in angular positions. Only the hinged tab 39 associated with the lowermost one of the shelves is unsupported and thus free to fall by gravity into a depending position. The paths of movement of the pusher fingers are such that they intersect tabs in depending positions but miss those in supported positions. As a result, only the hinged tab at the bottom is in a position to be contacted by a pusher finger 54, this being the lowermost one of the pusher fingers. As the tube 44 rotates, the pusher finger 54 of the lowermost one of all the fingers, therefore makes contact with the side of the hinged tab and in doing so it pushes the shelf forward. (See FIGURE 10.) The movement is sufficient to move the shelf off of the support 38 with which it is associated, and the shelf is free to fall by gravity into a depending position, which dumps the merchandise onto the chute. In this position, the abutment 33 on the rear edge of the shelf comes into contact with the flange 28 between the cut out areas 42 and is held thereagainst by the pressure of coil spring 37. Referring now to the middle one of the magazines shown in FIGURE 5, when the lowermost one of the shelves drops away, this removes the support for the hinged tab 39 associated with the shelf immediately above the lowermost one. This permits this hinged tab to assume a depending position in which it is in alignment with the pusher finger immediately above the lowermost one. Thus, the dropping away of the lowermost shelf preconditions the shelf immediately above it to be tripped upon the next operation of the handle associated with this particular magazine. It may be seen therefore that this is a progressive preconditioning, and as one shelf drops away it preconditions the next shelf immediately above it for tripping. Thus, the tripping progresses from shelf to shelf, going up the magazine from the lower end thereof to the upper end thereof. When a magazne is completely empty, all of the shelves hang down in the depending position shown for the lower three shelves of the magazine at the left side of FIGURE 5. It is found that reloading of the magazines is exceedingly simple because the operator need only place his finger in back of the lowermost one of the depending shelves and swing it up into a horizontal position at which the time the spring 37 on the hinge pin 30 of that shelf causes the shelf to move towards the rear so that the rear edge of the shelf is caused to seat upon the support 38 with which it is associated. Thus, the operator need only run his finger up the stack of shelves, bringing them progressively into horizontal positions. Once the shelves are in a horizontal position the articles of merchandise to be dispensed may be placed upon them.

The purpose of the abutments 33 on the shelves is so that when one has been tripped by moving it into a forward position, the coil spring 37 is held under pressure and thus the spring pressure of a tripped shelf does not have to be overcome in order to push the shelf next above it into tripped position. However, in the embodiment of the invention shown in FIGURES 1–10 a slight amount of pressure is put on tripped shelves in the very last part of the movement of the pusher fingers and, of course, this pressure is additive so that when the uppermost one of the shelves is tripped all shelves in that particulr magazine must be moved slightly during the very last part of pusher finger movement. This places increasing amounts of small pressures on the operating handle as the magazine empties. This pressure is hardly noticeable when there are a few shelves involved, however, when a great number of shelves are to be utilized in any one magazine the pressures required to operate a shelf toward the end of the stack becomes noticeable and possibly objectionable. For this reason provision is made in the modification of the invention shown in FIGURES 11–16 to prevent an accumulation of operating pressures, and is preferred in machines having great numbers of shelves in each magazine. Reference is now made to FIGURES 11–16.

As shown in FIGURES 11–16 the modified form of the invention utilizes the same wall 20 of the embodiment previously described and it also has a flange 23 on the forward edge of wall 20. Additionally, the hinge pins 30 are the same. A somewhat modified form of the angular strip 26 is employed. In this instance, one web 61 of the angular strip is riveted to wall 20 as shown at 62 and the other web identified at 63 extends at a right angle away from 20. This latter web carries a support identified at 64 which, in this instance, is turned forwardly from the edge of the web and then back upon itself to form a U-shaped channel. The web 63 does not have cut out areas in it as in the embodiment of the invention previously described. There are, however, spaces in between the individual supports as best shown in FIGURE 11. There is, of course, one support for each shelf in the magazine. The shelves in this instance are identified by 65 and they are generally rectangular in outline and have two hinge barrels 66 and 67 corresponding to the barrels 35 and 36 in the embodiment previously described. In each instance, these barrels are engaged around a hinge pin and a coil spring 68 is interposed between the wall 23 and the forward hinge barrel 67, being disposed on the hinge pin. As in the previous case, metal clips 69—69 are engaged on the outer ends of the hinge pins to hold them in place. The major change in the shelf occurs in the rear edge adjacent to hinge barrel 66 wherein it is stepped to provide a projection 70 which extends to the rear and an edge 71 which also projects beyond the rear edge 72 of the shelf, but it does dot extend as far beyond edge 72 as the outer end of projection 70. Projection 70 is positioned to rest on support 64 when the shelf is in its rearmost, horizontal position, being held thereon by the weight of the shelf and the pressure of coil spring 68.

The greatest modification occurs in the configuration and function of the hinged tabs which, in this instance, are identified by the numeral 73. Two hinge barrels 74—74 are provided for each hinged tab and they straddle the rear hinge barrel 66 of the shelf so that the tab and shelf are constrained to move together longitudinally of the axis of the hinge pin 30 upon which they are mounted. The hinged tab, in each instance, comprises a substantially long arm 75 and an integral C-shaped plate 76. The C-shaped plate is disposed at a right angle to the rear edge of the arm and it projects upwardly along the edge 71 of the shelf with which the hinge tab is associated, and is in sliding engagement with edge 71. The upper end of the C-shaped plate has a finger 77 turned over at right angles toward the front of the machine which overhangs edge 71. Referring to FIGURE 11 it may be seen that the arm 75 of hinged tab 73 is sufficiently long that it rests upon the shelf immediately below the one with which it is associated adjacent to the center thereof. The arm part of the tab is rather narrow and being disposed at the very rear end of the shelf, it serves as a stop for articles being placed upon the self, and thus, it has an added function over the tab of the modification previously described. It is to be noted that in this instance, the lower end of the arm is turned backwardly upon itself as shown at 78 to provide a smooth edge to contact the shelf upon which it rests.

The hinged tab of the modification has three positions. When two shelves are in horizontal position, the hinged tab between them has the C-shaped plate elevated with respect to the shelf with which the tab is associated so that the finger 77 is above and out of contact with the upper surface of the plate. In this position the open central area 79 of the C-shaped plate is aligned horizontally with a pusher finger identified by the numeral 80 in this instance. When the shelf beneath the hinged tab is tripped to fall down into a depending position the hinged tab also falls but in this case the overhanging finger 77 stops the tab in an intermediate depending position in which the upper part 81, constituting an abutment, of the C-shaped plate is in horizontal alignment with a pusher finger 80. This is the tripping position. Now, when the tube is rotated to move all fingers simultaneously toward the front of the machine, the tab hanging on the lowermost shelf is contacted and the tab and associated shelf are pushed toward the front of the machine to move projection 70 off the support 64. The shelf then falls under its own weight. This results in a third position for the tab where it is in fully depending position as shown in the lower part of FIGURE 11. In the fully depending position of the shelf the outer end of projection 70 rests against the inner wall 82 of the U-shaped channel comprising support 64. If all of the shelves were permitted to hang straight down after being tripped, the outer end of the projection 70 would have to be modified in order to have it rest against wall 82, therefore the shelves are held in angulated positions and this is done by bending the arm 75 of the lowermost one of the hinged tabs over at an angle as shown at 83 in FIGURE 11 so that it strikes the back wall 18 of the cabinet holding the shelf with which it is associated at an angle away from wall.

The fingers 80 in the modified form of the invention are simply turned over at a right angle in a forward direction from the outer edge of a continuous sheet metal strip 84 which is sandwiched between the flanges 53—53 and riveted to these flanges as shown in FIGURE 11. It is to be noted from this figure that the pusher fingers 80 are horizontally aligned with the central openings 79 of the upper three of the shelves shown, whereas at the lowermost one of the horizontal shelves the pusher finger is aligned with the abutment of the C-shaped plate, but that when the tabs are in their fully depending positions they are again clear of the pusher fingers. As a result, at no time is there any more force required in the rotating of the tube than that required to overcome the force of a single spring 68. Otherwise expressed, at no time in their paths of movement are the fingers required to depress more than one spring, thereby avoiding the additive spring pressures of the embodiment previously described.

As in the case of the previously described embodiment, the operation starts by tripping the lowermost shelf first and proceeds upwardly, shelf by shelf, each tripped shelf pre-conditioning the shelf immediately above it for tripping on the next operation of the handle associated with the magazine.

Having described my invention, I claim:

1. In a vending machine having a magazine, the improvement comprising:
   a plurality of hinge pins in said magazine arranged with their axes horizontal and in equally, vertically spaced relation,
   a drop-leaf shelf pivotally mounted on each of said hinge pins for swinging movement between a horizontal position and a depending position,
   each shelf movable within limits longitudinally of the axis of the hinge pin upon which it is mounted between a first position and a second position,
   a support engageable with said shelf in said first position to hold said shelf horizontally,
   spring means urging said shelf toward said first position,
   a tab hingedly associated with each shelf at the underside thereof and movable longitudinally therewith,
   a plurality of pusher fingers in a common vertical plane and being spaced in accordance with the spacing of said hinge pins,
   means to move said pusher fingers simultaneously in paths of movement generally paralleling said longitudinal axis of said hinge pins,
   each of said tabs being longer than the space between adjacent shelves, whereby each of said tabs rests upon the shelf immediately below the one with which it is associated in a slanting position when said shelf immediately below is horizontal, which slanting position is out of said paths of movement of said fingers,
   each tab adapted to swing by gravity into a path of movement of a finger when said shelf immediately below is in said depending position, whereby the tab associated with the lowermost one of the shelves in said magazine that is horizontal is the only tab in said paths of movement of said fingers at any one time such that contact is made between said only tab and a pusher finger to move the tab and the shelf with which it is associated from said first position to said second position off said support and permit the shelf to fall into depending position,
   and abutment means to prevent said spring means from moving a depending shelf longitudinally of the axis of the hinge pin with which it is associated.

2. In a vending machine having a magazine, the improvement comprising:
   a plurality of hinge pins in said magazine arranged with their axes horizontal and in equally, vertically spaced relation,
   a plurality of supports in vertical alignment within said magazine, there being one support for each of said hinge pins,
   a drop-leaf shelf pivotally mounted on each of said hinge pins, each shelf movable within limits longitudinally of the axis of the hinge pin upon which it is mounted between a first position in which it rests upon a support and a second position in which it is off said support and adapted to fall by gravity into a depending position,
   spring means urging said shelf toward said first position in which it rests upon a support,
   a tab hingedly associated with each shelf at the underside thereof and movable longitudinally therewith,
   a plurality of pusher fingers in a common vertical plane and being spaced in accordance with the spacing of said hinge pins,
   means to move said pusher fingers simultaneously in paths of movement generally paralleling the longitudinal axis of said hinge pins,
   each tab being longer than the space between adjacent shelves whereby each tab rests upon the shelf immediately below the one with which it is associated in a slanting position when said shelf immediately below is horizontal, which slanting position is out of said paths of movement of said fingers,
   each tab adapted to swing by gravity into a path of movement of a finger when said shelf immediately below is in depending position, whereby the tab on the lowermost one of the shelves in said magazine that is horizontal is the only tab in said paths of movement of said fingers at any one time, such that contact is made between said only tab and a pusher finger to move the tab and the shelf with which it is associated off said support to permit it to fall into depending position, and abutment means to prevent said spring means from moving a depending shelf longitudinally of the axis of the hinge pin with which it is associated.

3. In a vending machine having a magazine, the improvement comprising:
   a plurality of hinge pins in said magazine arranged with their axes horizontal and in equally, vertically spaced relation,
   a drop-leaf shelf pivotally mounted on each hinge pin for swinging movement between a horizontal position and a depending position, and each shelf movable within limits longitudinally of the axis of the hinge pin upon which it is mounted between a first position and a second position,
   a support engageable with said shelf in said first position to hold said shelf horizontally,
   a plurality of pusher fingers in a common vertical plane and being spaced in accordance with the spacing of said hinge pins,
   means to move said pusher fingers simultaneously in paths of movement generally paralleling the longitudinal axes of said hinge pins,
   means associated with each shelf movable into at least two different positions, one of which is in the path of movement of a pusher finger and one of which is out of the path of movement of a pusher finger,
   the last named means being movable with the shelf with which it is associated, whereby when said last named means is in the path of movement of a pusher finger said last named means and the shelf are pushed longitudinally of the axis of the hinge pin to move the shelf off said support and thereby permit it to fall by gravity into a depending position,
   and the last named means associated with a shelf movable into one of said paths of movement of said pusher fingers upon the tripping of the shelf immediately below the one with which it is associated.

4. In a vending machine having a magazine, the improvement comprising:
   a plurality of hinge pins in said magazine in equally, vertically spaced relation,
   a drop-leaf shelf mounted on each hinge pin both for swinging movement between a horizontal position and a depending position, and for limited movement longitudinally of the axis of said hinge pin between a first position and a second position,
   a support for each shelf to hold it horizontally in said first position,
   pivoted means associated with each shelf movable by gravity from a position in which said pivoted means rests upon a horizontally disposed shelf immediately below the shelf with which it is associated to a depending position when said shelf immediately below moves into a depending position,
   and means movable in paths generally paralleling the longitudinal axes of said hinge pins which miss said pivoted means when said pivoted means rest upon said shelves immediately below the shelves with which they are associated but which intersect said pivoted means when said pivoted means are in said depending positions, and means to move simultaneously said means movable in said paths, whereby a horizontally disposed shelf having said pivoted means in a depending position is movable longitudinally off said support upon contact by said means movable in said paths.

5. The improvement as set forth in claim 4 in which:
   said means movable in paths generally paralleling the longitudinal axes of said hinge pins comprises,
   a plurality of pusher fingers mounted upon a tubular member,
   and means rotatably mounting said tubular member within said magazine for rotative movement about a vertical axis at one of the ends of said shelves.

6. The improvement as set forth in claim 4 in which:
   said hinge pins extend from front to back in said magazine,
   and said means movable in said paths move forwardly to contact said pivoted means.

7. The improvement as set forth in claim 4 in which:
   said pivoted means in each instance, comprises a tab hinged to the same hinge pin as the shelf with which it is associated,
   said tab being longer than the distance between adjacent shelves, whereby it rests upon a shelf immediately below the one with which it is associated in a slanting position,
   and said tab being located adjacent to one end of the shelf with which it is associated to provide a stop for an article of merchandise being placed upon said shelf immediately below.

8. The improvement as set forth in claim 4, in which:
   spring means are provided to urge said shelves toward said first positions to hold said shelves on said supports,
   and means to prevent said spring means from urging said shelves toward said first positions effective in the depending positions of said shelves.

9. The improvement as set forth in claim 4, in which:
   said pivoted means comprises, in each instance, a tab hinged to the same hinge pin as the shelf with which it is associated,
   an arm on said tab adapted to rest upon the shelf immediately below the shelf with which said tab is associated,
   means at one side of said tab extending upwardly beyond an edge of the shelf with which it is associated and including means to overhang said edge in vertically spaced relation when said arm rests as aforesaid but adapted to drop down and contact the shelf with which the tab is associated to hold said tab in a depending position intersected by one of said paths when the shelf upon which said arm rests moves into a depending position.

10. In a vending machine having a magazine and a plurality of drop-leaf shelves mounted upon horizontally disposed hinge pins in equally, vertically spaced relation, the improvement comprising:
    means to move said shelves longitudinally of the axes of said hinge pins from a first position to a second position,
    support means to hold each of said drop-leaf shelves horizontally in said first position, but unsupported in said second position,
    and said means to move said drop-leaf shelves longitudinally of the axes of said hinge pins including a hinged tab associated with and movable longitudinally with each drop-leaf shelf and adapted to rest upon a horizontally disposed drop-leaf shelf immediately below the one with which it is associated but swingable by gravity into a depending position when said drop-leaf shelf immediately below drops.

11. In a vending machine having a magazine, the improvement comprising:
    a plurality of hinge pins in said magazine in equally, vertically spaced relation,
    a drop-leaf shelf mounted on each hinge pin both for swinging movement between a horizontal position and a depending position, and for limited movement longitudinally of the axis of said hinge pin between a first position and a second position,
    a support for each shelf to hold it horizontally in said first position,
    spring means urging each shelf towards said first position,
    a tab pivotally mounted on each hinge pin underneath the shelf on said hinge pin and adapted to move longitudinally of the axis of said pin with the shelf mounted on said pin, each tab being longer than the vertical spacing between hinge pins, whereby with all shelves in horizontal positions all tabs except the one associated with the lowermost shelf are supported by shelves in slanting positions and said tab associated with the lowermost shelf is free to fall by gravity into a depending position, a plurality of interconnected pusher fingers which are aligned vertically and spaced in accordance with the spacing of said hinge pins, means to move said fingers simultaneously in paths generally paralleling the longitudinal axes of said hinge pins, which paths miss slanting tabs but intersect the depending position of a tab, whereby movement of said fingers along said paths makes contact between a finger and a depending tab to move the shelf associated therewith off its support and thereby cause it to fall leaving no support for the tab resting thereon and permitting it to fall into a depending position.

References Cited in the file of this patent

UNITED STATES PATENTS

| | | |
|---|---|---|
| 1,672,236 | Varnell | June 5, 1928 |
| 2,623,804 | Neidig | Dec. 30, 1952 |
| 2,884,163 | Du Grenier et al. | Apr. 28, 1959 |
| 3,018,920 | Weber | Jan. 30, 1962 |